United States Patent
Kim (10) Patent No.: US 10,414,379 B2
(45) Date of Patent: Sep. 17, 2019

(54) WIPER BLADE

(71) Applicant: KIMBLADE CO., LTD., Suwon-si, Gyeonggi-Do (KR)

(72) Inventor: Hyungwoo Kim, Suwon-si (KR)

(73) Assignee: KIMBLADE CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/623,357

(22) Filed: Jun. 14, 2017

(65) Prior Publication Data
US 2017/0282861 A1    Oct. 5, 2017

Related U.S. Application Data

(63) Continuation-in-part of application No. PCT/KR2015/005634, filed on Jun. 5, 2015.

(60) Provisional application No. 62/427,142, filed on Nov. 28, 2016.

(30) Foreign Application Priority Data

| Dec. 18, 2014 | (KR) | 10-2014-0183026 |
| Apr. 14, 2015 | (KR) | 10-2015-0052142 |
| Jun. 17, 2016 | (KR) | 10-2016-0075623 |

(51) Int. Cl.
*B60S 1/38* (2006.01)

(52) U.S. Cl.
CPC .......... *B60S 1/38* (2013.01); *B60S 2001/3829* (2013.01); *B60S 2001/3836* (2013.01)

(58) Field of Classification Search
CPC ............ B60S 1/38; B60S 2001/3836; B60S 2001/3837; B60S 2001/3831; B60S 2001/3834; B60S 1/3829; A47L 13/11

USPC ............ 15/250.48, 245; D12/219, 220
See application file for complete search history.

(56) References Cited

U.S. PATENT DOCUMENTS

| 2,011,015 | A | * | 8/1935 | Schleicher | B60S 1/38 15/250.4 |
| 2,918,689 | A | * | 12/1959 | Pruett | B60S 1/524 118/266 |
| 3,566,432 | A | * | 3/1971 | Quinlan et al. | B60S 1/38 15/250.41 |

(Continued)

FOREIGN PATENT DOCUMENTS

| CN | 1511094 A | 7/2004 |
| DE | 2700527 | * 9/1978 |

(Continued)

OTHER PUBLICATIONS

Machine translation of description portion of EP publication 2181901, published May 2010.*

(Continued)

*Primary Examiner* — Gary K. Graham
(74) *Attorney, Agent, or Firm* — Lucas & Mercanti, LLP (57) ABSTRACT

The present invention provides a wiper blade, by balacing the opposite characteristics between the ease of operation and the cleaning force, the overall shape of the wiper blade is inclined laterally with elasticity in accordance with the moving direction of the blade mounting means for ease of operation , and the contact portion of the wiper blade for performing the cleaning is capable of maintaining an angle close to a right angle with respect to the cleaning surface, so that the wiper blade is also excellent in cleaning force.

3 Claims, 8 Drawing Sheets

(56) References Cited

U.S. PATENT DOCUMENTS

| | | | | |
|---|---|---|---|---|
| 3,636,583 | A | * | 1/1972 | Rosen ................... B60S 1/38 15/250.41 |
| 3,785,002 | A | * | 1/1974 | Quinlan ................. B60S 1/38 15/250.43 |
| 3,972,850 | A | * | 8/1976 | Hamilton ............. C08L 83/08 523/169 |
| 4,123,817 | A | | 11/1978 | Hartery |
| 4,567,621 | A | * | 2/1986 | Alley, Jr. ............ B60S 1/3801 15/250.03 |
| 4,847,940 | A | * | 7/1989 | Bradbury ............... B60S 1/38 15/250.4 |
| 5,251,357 | A | | 10/1993 | Jang et al. |
| 5,283,927 | A | * | 2/1994 | Gibbon ............... B29C 47/003 15/250.48 |
| 5,462,707 | A | * | 10/1995 | Nagy ................. B29C 47/003 15/250.451 |
| 6,230,358 | B1 | * | 5/2001 | Sahara .................. B60S 1/38 15/245 |
| 7,568,258 | B2 | * | 8/2009 | Jeuffe .................. B60S 1/38 15/250.361 |
| 2002/0129458 | A1 | * | 9/2002 | Hsieh .................. B60S 1/38 15/250.03 |
| 2004/0148728 | A1 | * | 8/2004 | Vogt ................. B05D 3/0254 15/250.48 |
| 2012/0297567 | A1 | * | 11/2012 | Hyer ................. B60S 1/3801 15/250.32 |

FOREIGN PATENT DOCUMENTS

| | | | |
|---|---|---|---|
| EP | 2181901 | * | 5/2010 |
| GB | 1316781 | * | 5/1973 |
| JP | 2001-322535 | * | 11/2001 |
| JP | 2003081066 A | | 3/2003 |
| JP | 2009502632 A | | 1/2009 |
| KR | 1019970040170 A | | 7/1997 |
| KR | 1020010007240 A | | 1/2001 |
| KR | 1020010073839 A | | 8/2001 |
| WO | 2008067864 A1 | | 6/2008 |

OTHER PUBLICATIONS

International Search Report for International Application No. PCT/KR2015/005634(2 pages) (dated Sep. 3, 2015).

* cited by examiner

Fig.1

PRIOR ART

WIPER BLADE

CROSS-REFERENCES TO RELATED APPLICATION

This is a continuation-in-part of PCT/KR2015/005634 filed Jun. 5, 2015, which claims priority from Korean Patent Application No. 10-2014-0183026 filed Dec. 18, 2014 and Korean Patent Application No. 10-2015-0052142 filed Apr. 14, 2015, and further claims priority from Korean Patent Application No. 10-2016-0075623 filed Jun. 17, 2016 and U.S. Provisional Application No. 62/427,142 filed Nov. 28, 2016. The contents of each of the prior filed priority applications are incorporated herein by reference.

FIELD OF THE INVENTION

The present invention relates generally to the wiper blade, by banacing the opposite characteristics between the ease of operation and the cleaning force, the overall shape of the wiper blade is inclined laterally with elasticity in accordance with the moving direction of the blade mounting means for ease of operation, and the contact portion of the wiper blade for performing the cleaning is capable of maintaining an angle close to a right angle with respect to the cleaning surface, so that the wiper blade is also excellent in cleaning force.

BACKGROUND OF THE INVENTION

Figure 1:
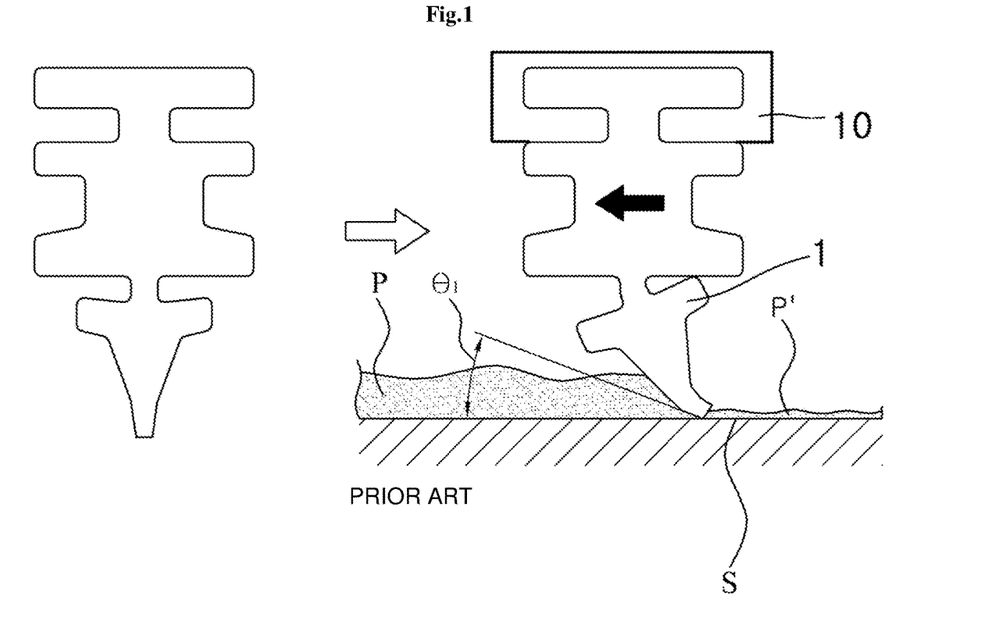
FIG. 1 is a schematic view showing the problem of prior wiper blade.

Generally as shown in FIG. 1, wiper blade 1 is mounted at blate mounting means 10 and operated to clean pollution P' at the cleaning surface S.

In the operation of the wiper blade, in order to move and operate smoothly in accordance with the movement of the blade mounting means 10, it is efficient that the wiper blade has a shape such that the wiper blade inclined laterally with elasticity in accordance with the moving direction of the blade mounting means.

On the contrary to this, when the cleaning force of the wiper blade is taken into consideration, the cleaning force is excellent as the wiper blade maintains an angle close to the cleaning surface S at right angles. When the blade mounting means 10 has a relatively small angle θ1 (typically 5 to 30 degrees) with respect to the cleaning surface S by elasticity along the moving direction of the blade mounting means 10 as shown in FIG. 1, the wiper blade comes into surface contact with the cleaning surface S, therefor the cleaning force is deteriorated and the residual contamination P 'remains.

Most of the existing inventions do not match the opposite characteristics between the ease of operation and the cleaning force. The prior art "Blade for automobile wiper (Korean Utility Model KR20-1998-021842A)" only discloses two blades projecting downward from the blade and connected to the windshield so as to perform direct wiping.

Another prior art patent, "Wiper Blade (Korean Registered Patent KR10-0488972B)" only discloses an insertion groove formed in a longitudinal direction on the upper end of both side faces of the upper end of the wiper blade, and contacts the window of the vehicle at the lower end of the insertion groove. And the auxiliary wings are formed integrally downward on both sides of the wing at the lower portion of the wiper blade in the vehicle wiper blade in which the wings for removing are integrally formed.

SUMMARY OF THE INVENTION

Accordingly, in order to overcome the problems of the prior art, is an object of the present invention to provide an wiper blade, by banacing the opposite characteristics between the ease of operation and the cleaning force, the overall shape of the wiper blade is inclined laterally with elasticity in accordance with the moving direction of the blade mounting means for ease of operation, and the contact portion of the wiper blade for performing the cleaning is in line contact with the cleaning surface S, while angle to the mounting part is maintained by means of 4 link sturucture provided by the angle maintaing bendable part, so that the wiper blade is also excellent in cleaning force.

In acoordance with an aspect of the present invention, the above object can be accomplished by providing an wiper blade made of elastic material, which comprise: a mounting part which is mounted at a blade mounting mean; a angle maintaing bendable part continuously formed from the mounting part and have one or more longitudinal internal cavity; and a contacting edge continuously formed from the angle maintaing bendable part and line contact to a cleaning surface to clean the pollution while angle to the mounting part is maintained by means of 4 link sturucture provided by the angle maintaing bendable part.

Further, in at least one embodiment, the internal cavity has rectangular shape and has rounded subsidences at each corners of the rectangular shape.

Further, in at least one embodiment, the outer surface of the contacting edge has the coating layer.

Further, in at least one embodiment, the contacting edge is composed of low friction silicone rubber.

Further, in at least one embodiment, the wiper blade further comprising: a porous sorption member installed to lower part of the contacting edge, and the porous sorption member temporarily absorb the pollution and then discharge the pollution again by pressing.

According to the present invention, the opposite characteristics between the ease of operation and the cleaning force can be harmonized, the overall shape of the wiper blade is inclined laterally with elasticity in accordance with the moving direction of the blade mounting means for ease of operation, and the contact portion of the wiper blade for performing the cleaning is in line contact with the cleaning surface S, while angle to the mounting part is maintained by means of 4 link sturucture provided by the angle maintaing bendable part, so that the wiper blade is also excellent in cleaning force.

The reference numbers and characters for the drawings and the following description are provided below:

S: cleaning surface
P: pollution

10: blade mounting mean
100: wiper blade
110: mounting part
111: clamping member
120: angle maintaining bendable part
121: internal cavity
122: rounded subsidence
130: contacting edge
131: coating layer
140: bending neck
141: surporting protrusion
142: surporting arm
160: porous sorption member

DETAILED DESCRIPTION OF THE INVENTION

Figure 2:
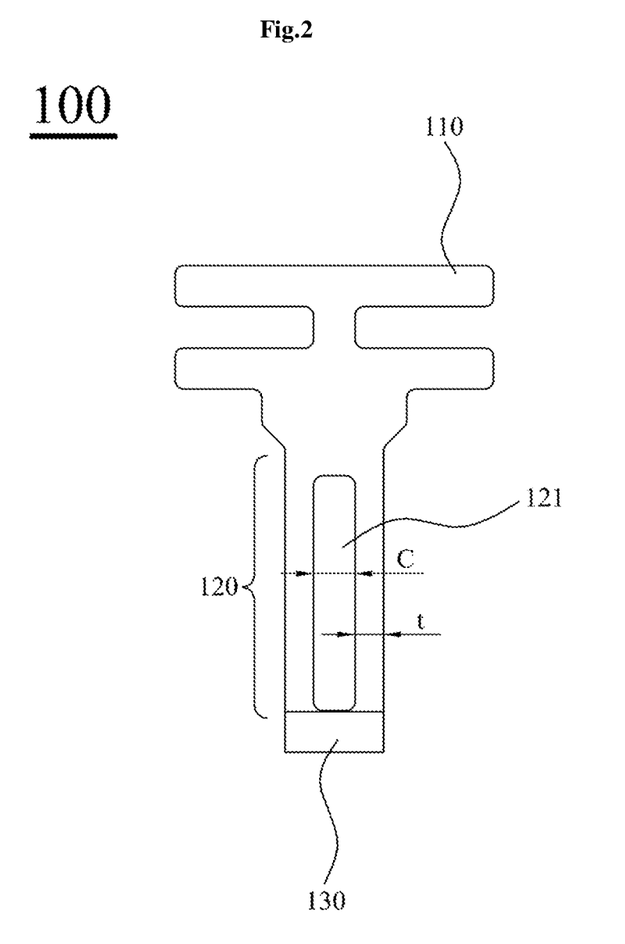
FIG. 2 is a sectional view of a first embodiment of present invention.
Figure 3:
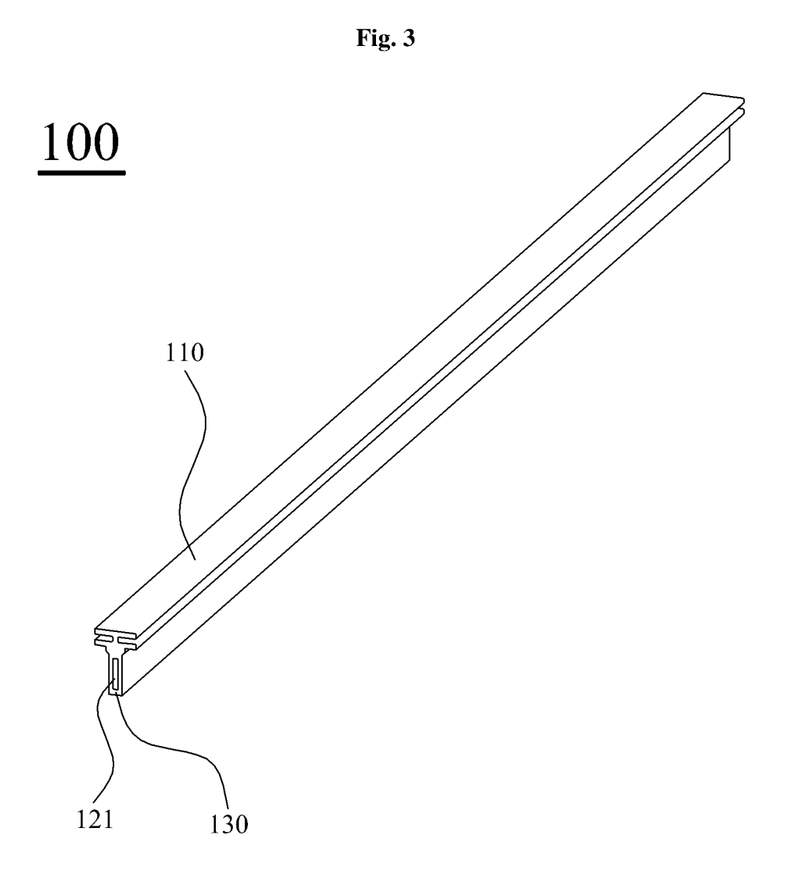
FIG. 3 is the perspective view of the first embodiment of present invention.

According to the preferred embodiment of the present invention, a wiper blade 100 is made of an elastic material and comprises a mounting part 110, an angle maintaining bendable part 120 and a contacting edge 130 as shown in FIG. 2. The elastic material constituting the wiper blade 100 may be made of rubber (NR, CR, NCR, EPDM) or a silicone material.

As shown in FIG. 2, the mounting part 110 is mounted to the blade mounting means 10 and may be manufactured in various forms according to the structure and shape of the blade mounting means 10.

As shown in FIG. 2, the angle maintaing bendable part 120 is continuously formed from the mounting part 110, and has one or more longitudinal internal cavity 121.

Figure 5:
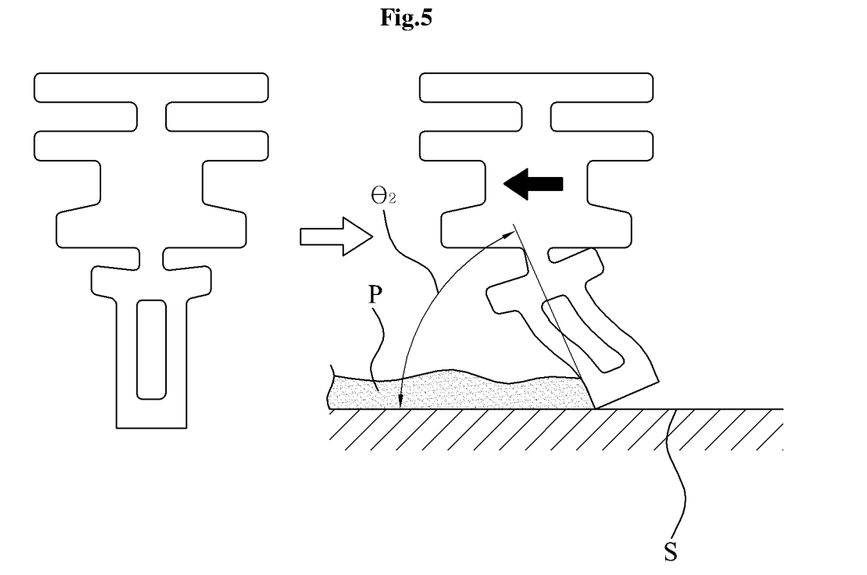
FIG. 5 is a schematic view showing the operation of the first embodiment of present invention.

According to the internal cavity 121, the angle maintaing bendable part 120 has a structure similar to a 4-bar linkage structure that connects the mounting part 110 and the contacting edge 130. Therefor, having adequate strength due to elasticity, the relative angle of the mounting part 110 and the contacting edge 130 is limited and relatively well maintained as shown in FIG. 5. And the overall shape of the wiper blade 100 is inclined laterally with elasticity in accordance with the moving direction of the blade mounting means 10.

Figure 4:
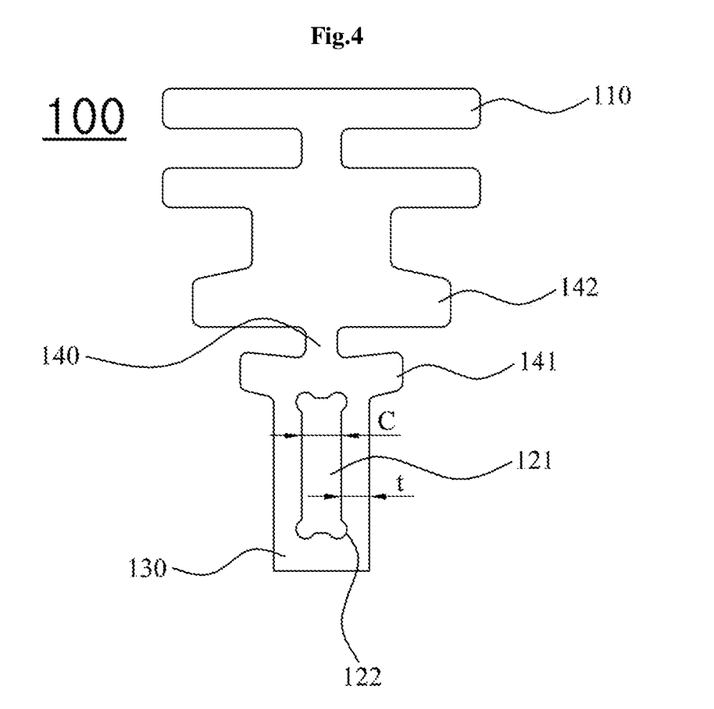
FIG. 4 is a sectional view of a sencond embodiment of present invention.

In order to the angle maintaing bendable part 120 has a structure similar to a 4-bar linkage structure, it is preferable that the the internal cavity 121 has a rectangular shape as shown in FIG. 2. In order to the angle maintaing bendable part 120 has a structure more similar to a 4-bar linkage structure, it is preferable that the internal cavity 121 further has rounded subsidences 122 at each corners of the rectangular shape as shown in FIG. 4. According to the rounded subsidences 122 which has been formed at the portion corresponding to the connection between the links in the four-bar linkage structure, the portion corresponding to the connection between the links becomes more freely rotatable, therefor the angle maintaing bendable part 120 have an operating characteristic that is more similar to the 4-bar linkage structure.

Meanwhile, in order to make a structure similar to a four-bar link with an elastic material, the angle maintaing bendable part 120 may have suitable hardeness for both elasticity and to perform a function of a link arm. So, both side portions of that the internal cavity 121 are not excessively bent or pressed and contracted while having appropriate structural rigidity. To achieve that characteristics, the thickness t of both side portions of the internal cavity 121 may be in the range of 0.2 to 1.2 mm and the angle maintaing bendable part 120 may have the shore hardness A type of 40 to 90.

If the thickness t of the both side portions of the internal cavity 121 is thinner than said range of thickness or the hardness of the of the both side portions of the internal cavity 121 is smaller than said hardness, the structural strength of both side portions of the internal cavity 121 is weakened and excessively bent or pressed to contract, So that the contact angle of the contacting edge 130 becomes small as in the case of the prior art. On the contrary to this, if the thickness t of both side portions of the internal cavity 121 is thicker than said range of thickness or the hardness of the of the both side portions of the internal cavity 121 is larger than said hardness, the structural strength of both side portions of the internal cavity 121 becomes stronger than necessary, the operation of the connecting portions between the links can not be smoothly implemented.

The structural strength of both side portions of the internal cavity 121, which functions as two link arms connecting the upper side and the lower side, has a significant influence on the length in the vertical direction (that is, the vertical height of the internal cavity 121). If the vertical height of the internal cavity 121 becomes larger than necessary and the ratio of the height of the internal cavity 121 to the thickness t of both side portions of the internal cavity 121 becomes large, the structural strength of both side portions of the internal cavity 121 is relatively weakened, so that the wiper blade 100 is excessively bent or pressed to be contracted, so that the contact angle of the contacting edge 130 is reduced, as in the prior conventional wiper blade. On the contrary to this, if the vertical height of the internal cavity 121 is smaller than necessary and the ratio of the height of the internal cavity 121 to the thickness t of both side portions of the internal cavity 121 becomes small, the structural strengths of both side portions of the internal cavity 121 are strengthened more than necessary, there is a high possibility that the operation of the connection portion between the links in the four-linkage structure can not be smoothly implemented. Therefore, when the thickness t of both side portions of the internal cavity 121 is in the range of 0.2 to 1.2 mm, the height of the internal cavity 121 preferably ranges from 2.0 to 6.0 mm.

Figure 6:
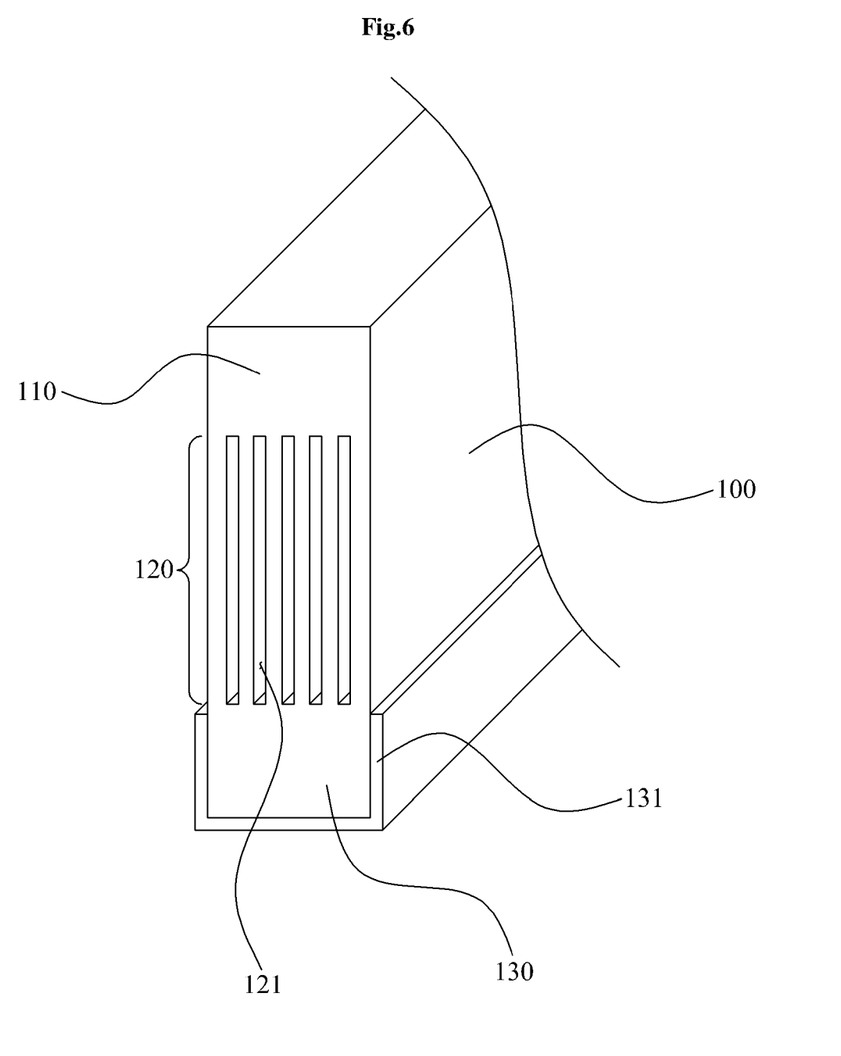
FIG. 6 is a sectional view of a third embodiment of present invention.

According to another embodiment of the present invention, the angle maintaing bendable part 120 may have a plurality of the internal cavity 121 as shown in FIG. 6.

By plurality of the internal cavity 121, the angle maintaing bendable part 120 has a structure similar to mulitiple 4-bar linkage structure. Therefor having adequate strength due to elasticity, the relative angle of the mounting part 110 and the contacting edge 130 is limited better and relatively well maintained and the overall shape of the wiper blade 100 is inclined laterally with elasticity in accordance with the moving direction of the blade mounting means 10.

The contacting edge 130 is continuously formed from the angle maintaing bendable part 120 as shown in FIG. 2, and line contact to a cleaning surface (S) to clean the pollution (P) as shown in FIG. 5. As discrived above, while angle to the mounting part (110) is maintained by means of 4-bar linkage sturucture provided by the angle maintaining bendable part (120), the contacting edge 130 can make a line contact with the cleaning surface S with a relatively large angle θ2. Therefore, the contact area where the contacting edge 130 contacts the cleaning surface S is kept small, so that the frictional force due to the operation is reduced, and the pressing force against the cleaning surface (S) becomes rather strong thus the cleaning force for wiping the pollution P become excellent. Meanwhile, the cross section of the contacting edge 130 can be a shape of part of a polygon or a shape of double or triple blades.

As shown in FIG. 6, the outer surface of the contacting edge 130 may have the coating layer 131 to increase the strength while reducing friction. As the material of the coating layer 131, it is possible to select one of various synthetic resins or silicone. In one embodiment, it is preferable that the coating layer 131 is made of a silicone material or a Teflon material having a low frictional force. The coating layer 131 may be formed by bonding a high-strength film.

As shown in FIG. 2, unlike the mounting part 110 and the angle maintaing bendable part 120, the contacting edge 130 may made of a low friction silicone material. In this case, it is preferable that the wiper blade 100 is manufactured such that the wiper blade 100 is extrusion-molded and then cutt. Moreover, the mounting part 110 and the angle maintaing bendable part 120 are extrusion-molded simultaneously with the contacting edge 130 which consist of another characteristic silicone material.

It is preferable that the wiper blade 100 is inclined at a predetermined angle in accordance with the operation of the reciprocating wiper so that the wiper can operate more smoothly. For this purpose, a bending neck 140 may be formed between the mounting part 110 and the angle maintaing bendable 120 as shown in FIG. 4. Moreover, the predetermined angle may be in a range of about 5 to 30 degrees so that the angle θ2 at which the contacting edge 130 contacts the cleaning surface S can be maintained at a relatively large angle. In the pursuit of this purpose a supporting arm 142 is further formed at the lower end of the mounting part 110 and a supporting protrusion 141 is further formed at the upper end of the angle maintaing bendable 120 as shown in FIG. 4.

Figure 8:
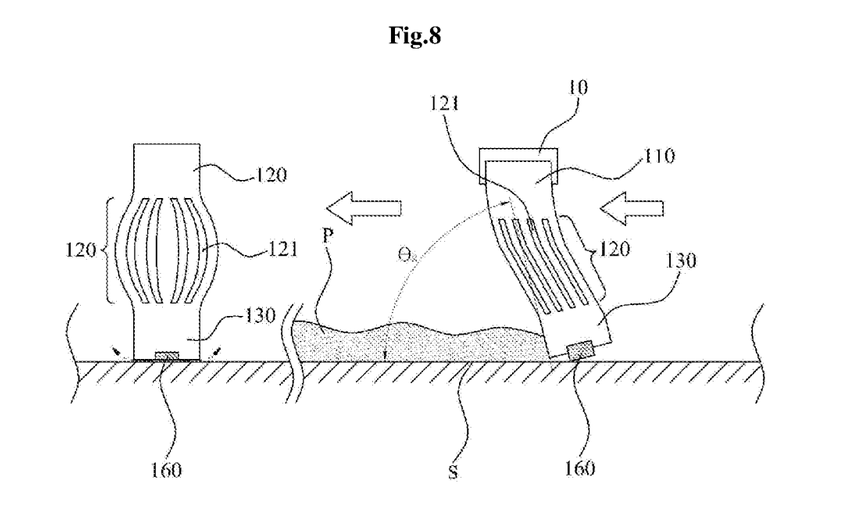
FIG. 8 is a schematic view showing the operation of the fourth embodiment of present invention.

Therefore, as shown in FIG. 8, when the bending neck 140 is bent at the predetermined angle according to the operation of the wiper, the surporting protrusion 141 is contacted with the supporting arm 142 and prevent more bending, thus the angle θ2 at which the contacting edge 130 contacts the cleaning surface S is limited to be maintained at a relatively large angle, while the wiper blade 100 is being inclined by a predetermined angle corresponding to the operating direction.

Figure 7:
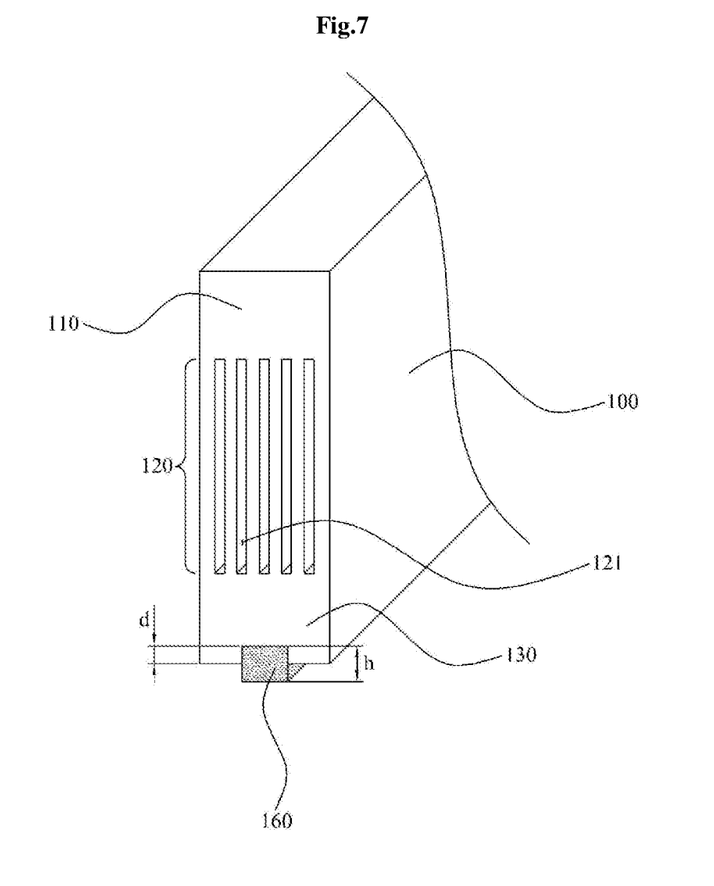
FIG. 7 is a sectional view of a fourth embodiment of present invention.

As shown in FIG. 7, the porous sorption member 160 installed to lower part of the contacting edge 130, and the porous sorption member 160 is made of porous sorption material, temporarily absorb the remaining pollution P which can not be removed by th contacting edge 130, and then discharge the pollution (P) again by pressing when the direction of operation is changing.

The porous sorption member 160 may be formed in various sizes and shapes depending on its operating characteristics. When the porous sorption member 160 is emphasized to maintain the state where the porous sorption member 160 is firmly mounted on the contact part 130, the porous sorption member 160 is inserted to lower part of the contacting edge 130 by a predetermined depth (d) as shown in FIG. 7. The predetermined depth d may be less than half the vertical height of the porous sorption member 160 in order to ensure a sufficient compression effect so that the pollution absorbed by the porous sorption member 160 can be efficiently discharged again by compression.

When the porous sorption member 160 focuses on the operating characteristic in order to enhance the effect of absorbing the residual pollution, the porous sorption member 160 has narrow width and a long length.

The invention claimed is:

1. A wiper blade comprising:
   a mounting part which is mounted at a blade mounting means;
   an angle maintaining bendable part continuously formed from the mounting part, and having one longitudinal internal cavity
      wherein the internal cavity has a rectangular shape and has rounded subsidences at each corner of the rectangular shape,
      a side portion on both sides of the internal cavity has a same thickness between 0.2 mm to 1.2 mm,
      wherein the internal cavity has a height between 2.0 mm and 6.0 mm, and
      wherein said angle maintaining bendable part is made of elastic material having a shore hardness A type of 40 to 90; and
   a single flat rectangular contacting edge continuously formed from the angle maintaining bendable part and line contact to a cleaning surface (S) to clean the pollution (P) while angle to the mounting part is maintained by means of 4-bar linkage structure provided by the angle maintaining bendable part.

2. The wiper blade of claim 1, wherein an outer surface of the contacting edge has a coating layer.

3. The wiper blade of claim 1, wherein the contacting edge is composed of low friction silicone rubber.

* * * * *